United States Patent
Zhang et al.

(10) Patent No.: US 10,412,628 B2
(45) Date of Patent: Sep. 10, 2019

(54) METHODS AND ARRANGEMENTS FOR COMMUNICATION IN ULTRA-RELIABLE AND LOW-LATENCY COMMUNICATIONS (URLLC)

(71) Applicant: Telefonaktiebolaget LM Ericsson (publ), Stockholm (SE)

(72) Inventors: Zhan Zhang, Beijing (CN); Shaohua Li, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/558,556

(22) PCT Filed: Aug. 7, 2017

(86) PCT No.: PCT/CN2017/096230
§ 371 (c)(1),
(2) Date: Sep. 14, 2017

(87) PCT Pub. No.: WO2018/059129
PCT Pub. Date: Apr. 5, 2018

(65) Prior Publication Data
US 2018/0249370 A1    Aug. 30, 2018

(30) Foreign Application Priority Data
Sep. 30, 2016    (WO) ................ PCT/CN2016/101082

(51) Int. Cl.
*H04W 4/00*    (2018.01)
*H04W 28/06*    (2009.01)
(Continued)

(52) U.S. Cl.
CPC ............... *H04W 28/06* (2013.01); *H04L 1/00* (2013.01); *H04W 72/087* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 2014/0192732 A1* | 7/2014 | Chen | H04L 1/0003 370/329 |
| 2015/0085729 A1* | 3/2015 | Majjigi | H04W 52/12 370/311 |

(Continued)

FOREIGN PATENT DOCUMENTS

| | | |
|---|---|---|
| CN | 105979597 A | 9/2016 |
| WO | 2017121417 A1 | 7/2017 |

OTHER PUBLICATIONS

International Search Report and Written Opinion for Application No. PCT/CN2017/096230, dated Oct. 26, 2017, 13 pages.

(Continued)

*Primary Examiner* — Farah Faroul
(74) *Attorney, Agent, or Firm* — NDWE LLP (57) ABSTRACT

Different Transmission Block Size/Modulation and Coding Scheme (TBS/MCS) mapping tables, especially different TBS/MCS mapping table sets, are used for Ultra-Reliable and Low-Latency Communications (URLLC) traffic and non-URLLC traffic. A TBS/MCS mapping table for URLLC is selected by a network node, upon determination of traffic type as URLLC, and informed to a UE. The informing can be a TBS/MCS mapping table index or a scaling factor. After receiving the information of TBS/MCS mapping table selection, the UE identifies the selected TBS/MCS mapping table from its TBS/MCS mapping table set for URLLC, or gen- (Continued)

erates a new TBS/MCS mapping table based on the scaling factor and a corresponding TBS/MCS mapping table.

20 Claims, 2 Drawing Sheets

(51) Int. Cl.
    *H04L 1/00*     (2006.01)
    *H04W 72/08*     (2009.01)
    *H04W 72/04*     (2009.01)

(56) References Cited

U.S. PATENT DOCUMENTS

| | | | |
|---|---|---|---|
| 2016/0112898 A1* | 4/2016 | Chen | H04W 28/0215 370/235 |
| 2017/0238292 A1* | 8/2017 | Rico Alvarino | H04L 5/0048 370/329 |
| 2017/0367073 A1* | 12/2017 | Murugan | H04B 1/0053 |
| 2018/0019838 A1* | 1/2018 | Yeo | H04L 1/0036 |
| 2018/0034596 A1* | 2/2018 | Noh | H04L 1/0009 |
| 2018/0041858 A1* | 2/2018 | Sheng | H04L 1/0009 |
| 2018/0049047 A1* | 2/2018 | Lin | H04W 24/02 |
| 2018/0049272 A1* | 2/2018 | Bagheri | H04W 76/28 |
| 2018/0070369 A1* | 3/2018 | Papasakellariou | H04B 7/024 |
| 2018/0102877 A1* | 4/2018 | Jiang | H04L 1/0003 |
| 2018/0152907 A1* | 5/2018 | Zhang | H04W 74/006 |
| 2018/0175989 A1* | 6/2018 | Li | H04L 5/0055 |
| 2018/0176910 A1* | 6/2018 | Yang | H04L 5/0003 |
| 2018/0242282 A1* | 8/2018 | Li | H04W 72/02 |
| 2018/0310282 A1* | 10/2018 | Shi | H04W 72/042 |

OTHER PUBLICATIONS

NTT DoCoMo, Inc. "Overview of mMTC and URLLC for NR access technology" R1-163106, Apr. 2, 2016, 3GPP TSG RAN WG1 #84bis, 3 pages.
ZTE "Consideration on channel coding for NR" R1-166413, Aug. 13, 2016, No. 3GPP TSG RAN WG1 #86, 12 pages.
ZTE Corp., et al., "Consideration on Outer Code for NR," R1-166416, Aug. 13, 2016, 3GPP TSG RAN WG1 #86, 9 pages.
ZTE, "Uplink Data Scheduling and Transmission for NR Frame Structure," R1-166407, Aug. 13, 2016, 3GPP TSG RAN WG1 Meeting #86, 6 pages.
"3GPP TS 36.213, LTE; Evolved Universal Terrestrial Radio Access (E-UTRA); Physical layer procedures", (Feb. 2015), 107 pages, version 12.4.0, Release 12, European Telecommunications Standards Institute.
"3GPP TR 22.862, 3rd Generation Partnership Project; Technical Specification Group Services and System Aspects; Feasibility Study on New Services and Markets Technology Enablers—Critical Communications; Stage 1 (Release 14)", (Jun. 2016), 32 pages, V14.0.0, 3GPP Organizational Partners.
"3GPP TS 36.213, 3rd Generation Partnership Project; Technical Specification Group Radio Access Network; Evolved Universal Terrestrial Radio Access (E-UTRA); Physical layer procedures (Release 13)", (Jun. 2016), 381 pages, V13.2.0, 3GPP Organizational Partners.
Extended European Search Report for Application No. 17764309.5, dated Oct. 24, 2018, 9 pages.
MediaTek, "Remaining Issues on NR System Evaluation for mMTC," 3GPP TSG RAN WG1 Meeting #86, Gothenburg, Sweden, Aug. 22-26, 2016, R1-167540, 3 pages.
ZTE, "Consideration on channel coding for NR," 3GPP TSG RAN WG1 #86, Gothenburg, Sweden, Aug. 22-26, 2016, R1-167901, 14 pages.

* cited by examiner

METHODS AND ARRANGEMENTS FOR COMMUNICATION IN ULTRA-RELIABLE AND LOW-LATENCY COMMUNICATIONS (URLLC)

CROSS-REFERENCE TO RELATED APPLICATIONS

This application is a National stage of International Application No. PCT/CN2017/096230, filed Aug. 7, 2017, which claims priority to International Application No. PCT/CN2016/101082, filed Sep. 30, 2016, which are hereby incorporated by reference.

TECHNICAL FIELD

The present disclosure generally relates to the technical field of wireless communications, and particularly to communication between User Equipment and Network Node involved in Ultra-Reliable and Low-Latency Communications (URLLC).

BACKGROUND

In $3^{rd}$ Generation Partnership Projection (3GPP), TS 36.213 (V13.2.0, June 2016) defines Transport Block Size (TBS) to be used by network entities for communications. Referring to Section 7.1.7.2.1 of TS 36.213, for $1 \leq N_{PRB} \leq 110$, the TBS is given by the ($I_{TBS}$, $N_{PRB}$) entry of Table 7.1.7.2.1-1 (partly truncated as Table 1 below). Herein, $I_{TBS}$ denotes TBS index determined by Modulation and Coding Scheme (MCS), and $N_{PRB}$ denotes total number of allocated Physical Resource Blocks (PRBs).

This is a basic L1 (Layer 1) parameter for Media Access Control (MAC) operation. Specifically, MAC provides the dynamic transport block size from a table as this one to Radio Link Control (RLC) sublayer, the RLC may accordingly build its RLC Packet Data Unit (PDU), and during this PDU construction, some Service Data Unit (SDU) segmentation and concatenation are done.

In general, Table 1 holds a TBS candidate listing for MAC operation. A plurality of such tables are made available at 3GPP standards for different spatial layers and Downlink Control Information (DCI) formats.

Also, in 3GPP TS 36.213, several TBS translation tables (one-layer to two-layer, three layer and four-layer) are also provided (cf. Table 7.1.7.2.2-1, Table 7.1.7.2.4-1, Table 7.1.7.2.5-1 in TS 36.213).

TABLE 1

Transport block size table (dimension 34 × 110)
(Table 7.1.7.2.1-1 in TS 36.213)

| $I_{TBS}$ | \multicolumn{10}{c}{$N_{PRB}$} |
|---|---|---|---|---|---|---|---|---|---|---|
|  | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

. . .

| $I_{TBS}$ | \multicolumn{10}{c}{$N_{PRB}$} |
|---|---|---|---|---|---|---|---|---|---|---|
|  | 101 | 102 | 103 | 104 | 105 | 106 | 107 | 108 | 109 | 110 |
| 27 | 66592 | 66592 | 68808 | 68808 | 68808 | 71112 | 71112 | 71112 | 71112 | 73712 |
| 28 | 71112 | 71112 | 73712 | 73712 | 73712 | 75376 | 75376 | 76208 | 76208 | 76208 |
| 29 | 75376 | 76208 | 76208 | 76208 | 78704 | 78704 | 78704 | 81176 | 81176 | 81176 |
| 30 | 78704 | 81176 | 81176 | 81176 | 81176 | 84760 | 84760 | 84760 | 84760 | 87936 |
| 31 | 84760 | 84760 | 84760 | 84760 | 87936 | 87936 | 87936 | 87936 | 90816 | 90816 |

TABLE 1-continued

| 32 | 87936 | 87936 | 87936 | 87936 | 90816 | 90816 | 90816 | 93800 | 93800 | 93800 |
|---|---|---|---|---|---|---|---|---|---|---|
| 33 | 97896 | 97896 | 97896 | 97896 | 97896 | 97896 | 97896 | 97896 | 97896 | 97896 |
| 33A | 87936 | 87936 | 87936 | 90816 | 90816 | 90816 | 93800 | 93800 | 93800 | 97896 |

URLLC means Ultra-Reliable and Low-Latency Communications, which was one of cases defined in 3GPP TR 22.862 (V14.0.0, June 2016). In this category, both reliability of communication and low latency are highly demanded. It can be noted that these requirements are mutually conflicting in some aspects as usually these two aspects are traded for each other. In general, it is relatively easy to achieve one aspect by trading-off the other, while for URLLC both should be met at the same time, which pose a remarkable challenge to User-Plane (UP) design. According to 3GPP TR 22.862, the latency requirements for URLLC ranges from 1 ms to 10 ms for different concrete applications ranging from automation applications, smart grid to intelligent transportation, and reliability from a residual error rate of $10^{-4}$, $10^{-6}$, to $10^{-9}$. The packets in URLLC scenarios are of quite small size such as 50 to 100 bytes per packet. It is noted that such residual error rate calculation will also consider those packet later than the demanded latency bound such as 1 ms or 10 ms as errors or invalid in the context of URLLC.

Simultaneously achieving such high demands on both reliability and latency may impact many layers and components of both Radio Access Network (RAN) and Core Network (CN). URLLC can be regarded as an extremely high QoS use case both in RAN and CN.

Additionally, Bandwidth reduced Low complexity (BL) User Equipment (UE) and Coverage Enhancement (CE) UE are specified in 3GPP Standard Release 13. Long Term Evolution (LTE)-M1 transmits Mobile Physical Downlink Control CHannel (MPDCCH), Physical Downlink Shared Channel (PDSCH), Physical Uplink Shared CHannel (PUSCH) in time domain repetition fashion and works only at 1.4 MHz. This type is for Machine Type Communication (MTC) in narrow band.

In URLLC cases, the high reliability and latency requirements make the current TBS table mapping less effective. The LTE-M1 UE type: (BL UE/CE UE) has been specified in release 13, and some reliability boosting by repetition-based transmission was standardized. However, URLLC may have a higher reliability requirement and its short latency requirement makes the time domain redundancy-based diversity less attractive as it may take more time. For instance, the retransmission-based time diversity takes time, it may not be allowed for most latency rigorous URLLC use cases. Besides, dynamic link adaptation takes time to converge. A more robust link gain control mechanism is necessary for URLLC.

SUMMARY

Considering the problems above, the present disclosure focuses on new transmission block designs for URLLC and communication associated with URLLC traffic. In URLLC, frequency diversity such as frequency band spreading based scheme, and multiple-carrier duplication kind of transmission scheme will be necessary. In such a context, frequency band spreading will render smaller TBSs than those specified in the current TBS tables. To create new TBS mapping for URLLC with certain level of compatibility with the current standard is of a great significance to $5^{th}$ Generation New Radio (5G NR).

It is proposed to introduce different sets of TBS tables. One set of TBS tables is used for URLLC, and another set is used for non-URLLC. For example, different TBS tables and different 1-layer-to-N-layers TBS translation tables are used for different traffics: URLLC ones and non-URLLC ones. As another example, different TBS tables and different 1-layer-to-N-layers TBS translation tables are used for different URLLC grades in terms of reliability and latency requirements.

There may be some ways to generate these different tables. For example, TBS tables in one set can be a scaled version of those in another set (for example, Table 1 above). As another example, TBS tables can be generated according to URLLC design principle, such as finer granularity refinement and lower minimum TBSs than existing tables.

UE will be informed of the table selection. For example, Radio Resource Control (RRC) or Downlink Control Information (DCI) may carry information about table selection, e.g., with UE pre-configured about the specific tables when establishing a radio bearer.

According to an aspect of the present disclosure, a method of in a network node for communicating with a UE is proposed. The method comprises: determining traffic type of the UE; selecting a Transmission Block Size (TBS) table from a first set of TBS tables for Ultra-Reliable and Low-Latency Communications (URLLC) traffics, in response to the traffic type being URLLC; and informing the UE the selection of TBS table.

In a first example, there are more than one grade of URLLC traffic according to requirements of reliability and latency. The selecting a TBS table comprises selecting a TBS table from a first subset of TBS tables for URLLC, in response to the traffic type being a first URLLC grade, wherein the first URLLC grade is associated with the first subset of TBS tables which is a subset of the first set of TBS tables for URLLC. In a second example, the informing of the selection of the TBS table is implemented by a TBS index. The first set of TBS table is already known by both the eNB and the UE. The UE can identify the selected TBS table through the TBS index.

In a third example, the informing of the selection of the TBS table is implemented by a scaling factor. The UE can generate a TBS table according to a corresponding TBS table and the scaling factor. It should be noted that it is unnecessary for both the eNB and UE to be configured the first set of TBS tables before the selection. In this example, the selected TBS table for URLLC traffic is not known to the UE when UE was informed of the selection of the TBS table. The informing of a scaling factor would save both traffic load and UE memory for pre-configuration.

In a fourth example, the set of TBS tables for URLLC traffics are scaled from the set of TBS tables for non-URLLC traffics. For example, a value of TBS in the URLLC set is smaller than a value of a corresponding TBS in the non-URLLC set. Dimensions of a TBS table in the URLLC set can be different from or identical to dimensions of a corresponding TBS table in the non-URLLC set, for example, fewer rows and/or columns, or identical rows but more columns. For example, the first set of TBS tables are scaled from the second set of TBS tables based on a scaling factor. The scaling factor can be a frequency spreading factor. According to another aspect of the present disclosure, a method in a UE for communicating with a network node is proposed. The method comprises: requesting for establishing a radio bearer with the network node for communication of URLLC traffic; receiving information of a selected TBS table for URLLC traffic; and choosing a TBS from the selected TBS table according to its scheduling information.

According to a third aspect of the present disclosure, an arrangement capable of URLLC communication with a user equipment is proposed. The arrangement can be used in a network node. The arrangement comprises a processing unit and at least one computer program product, which comprises computer readable instructions which when executed by the processing unit, causes the arrangement to perform the actions described in the description.

According to a fourth aspect of the present disclosure, an arrangement capable of URLLC communication with a network node is proposed. The arrangement can be a user equipment. The arrangement comprises a processing unit and at least one computer program product, which comprises computer readable instructions which when executed by the processing unit, causes the arrangement to perform the actions described in the description.

With the proposed scheme, the URLLC transport block design requirement can be fulfilled by different TBS tables, efficient and backward compatible table generating ways, and relevant operational features (such as informing the tables, table selections, and so on).

BRIEF DESCRIPTION OF THE DRAWINGS

The above and other objects, features, and advantages of the present disclosure will become apparent from the following descriptions on embodiments of the present disclosure with reference to the drawings, in which.

In the drawings, similar or same steps and/or elements are designated with similar or same referential numbers. It is to be noted that not all the steps and/or elements shown in the drawings are necessary for some embodiments of the present disclosure.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Since various wireless systems may benefit from exploiting the ideas covered within this disclosure as will be appreciated by those skilled in the art, terms like "base station", "user equipment", "access point" and "network node" as used herein should be understood in a broad sense. Specifically, the base station should be understood to encompass a legacy base station in a $2^{nd}$ Generation (2G) network, a NodeB in a $3^{rd}$ Generation (3G) network, an evolved NodeB (eNode B) in a $4^{th}$ or $5^{th}$ Generation (4G or 5G) or future evolved network (e.g., LTE network, LTE-A network etc.), and the like. The user equipment should be understood to encompass a mobile telephone, a smartphone, a wireless-enabled tablet or personal computer, a wireless machine-to-machine unit, and the like. The access point should be understood to encompass a wireless switch, a wireless router, a wireless hub, a wireless bridge, or any device capable of being used in a wireless local area network for accessing functionalities, and the like. The core network node should be understood to encompass a Mobility Management Entity (MME), a Serving GPRS Support Node (SGSN), and the like.

Figure 1:
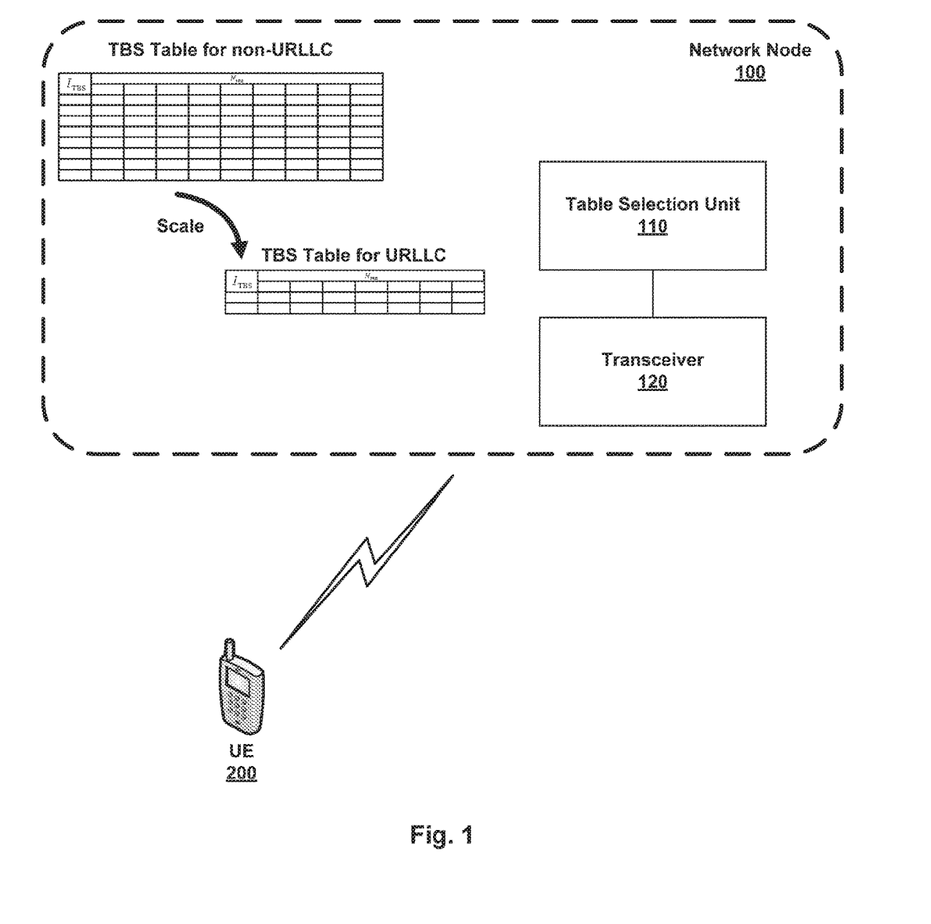
FIG. 1 shows a schematic diagram of a communication network in which the present disclosure is deployed.
Figure 2:
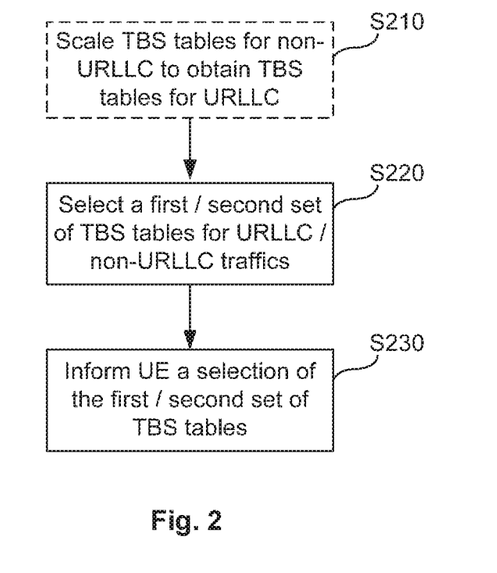
FIG. 2 shows a flow chart of a TBS table selection method according to some embodiments of the present disclosure.

FIG. 1 shows a schematic diagram of a communication network in which the present disclosure is deployed, and FIG. 2 shows a flow chart of a TBS table selection method according to some embodiments of the present disclosure.

In conjunction with FIG. 1 and FIG. 2, a network node 100 (e.g., eNB) will generate (S210) and/or select (S220) TBS/MCS mapping tables for different traffics in a table selection unit 110, and will inform (S230) table selections and/or a scaling factor to a UE 200 via a transceiver 120 during radio bearer establishment procedure of the UE 200. With the informed table selections, UE 200 will identify the TBS/MCS mapping tables to be used for different traffics.

Or, with the informed scaling factor, UE 200 can obtain/generate the TBS/MCS mapping tables to be used for different traffics. The TBS/MCS mapping tables can be defined in advance or can be generated in real-time.

According to the present disclosure, different sets of TBS/MCS mapping tables are defined considering different URLLC requirements.

In one embodiment, a plurality of TBS/MCS mapping tables are defined, one or more TBS/MCS mapping tables are selected by the table selection unit 110 from the plurality of TBS/MCS mapping tables for URLLC traffics, and another one or more TBS/MCS mapping tables are selected by the table selection unit 110 from the plurality of TBS/MCS mapping tables for non-URLLC traffics. These two sets are designed to cover different (or partially different) ranges in TBS; for example, URLLC tables cover TBS ranges smaller than that of non-URLLC ones.

In another embodiment, a plurality of TBS/MCS mapping tables are defined, one or more TBS/MCS mapping tables are selected by the table selection unit 110 from the plurality of TBS/MCS mapping tables for a first URLLC grade traffics, and another one or more TBS/MCS mapping tables are selected by the table selection unit 110 from the plurality of TBS/MCS mapping tables for a second URLLC grade traffics. In one example, the URLLC grades can be defined in terms of reliability and latency requirements. Compared between a URLLC grade having higher reliability and latency requirements (higher URLLC grade) and a URLLC grade having lower reliability and latency requirements (lower URLLC grade), the tables for the higher URLLC grade will have TBS ranges smaller than those for the lower URLLC grade.

Herein, TBS/MCS mapping tables may comprise one or more of
- Mapping table between MCS (Modulation and Coding Scheme) and TBS index (Table 7.1.7.1-1 of TS 36.213 or a similar one);
- Transport block size table providing mapping between total allocated resource blocks and TBS index (Table 7.1.7.2.1-1 of TS 36.213 or a similar one);
- Transport block size table between different layers (Table 7.1.7.2.2-1, Table 7.1.7.2.4-1, Table 7.1.7.2.5-1 of TS 36.213 or similar ones);
- Other mapping table which is not listed here The TBS of one set is a scaled version of the TBS of anther set. For example, the TBS of one set is scaled from the TBS of another set with a unified scaling factor or several different scaling factors so that the TBS of one set has a smaller TBS range than the other. One approach is to consider an existing TBS table set as TBS table set for non-URLLC traffics. A TBS table set for URLLC traffics is scaled from the TBS table set for non-URLLC traffics. Members of these two sets are directly associated through the scaling factors. Another approach is to generate these two sets from the existing TBS table sets based on different scaling factors. Members of these two sets are indirectly associated through the scaling factors. For example, the scaling factor(s) may be selected according to TBS index $I_{TBS}$ and/or total number of allocated PRBs $N_{PRB}$. As another example, the scaling factor(s) may be selected according to frequency domain spreading factor.

Alternatively, TBS tables can be generated according to URLLC design principle, such as finer granularity refinement and lower minimum TBS than existing tables.

Since the TBS of one set can be the scale of TBS of another set, the different table sets may have a mapping relationship each other to efficiently meet the URLLC needs without losing compatibility. In other words, a created TBS table (mapped from existing TBS tables) for URLLC has backward compatibility to an existing one specified in 3GPP LTE.

To facilitate the compatibility to non-URLLC service, a TBS mapping table can be used for both URLLC and non-URLLC. However, the URLLC information bits are of a higher error protection by lower coding bit rate. This is usually made by having a higher PRB blocks with the same number of bits.

For example, the TBS with 100 PRBs for non-URLLC is X bits, the TBS with 100 PRBs for URLLC may be floor (X/N) bits. N≥2 is a frequency spreading factor to boost the reliability by either spreading the carried URLLC information bits by coding or repetition frequency.

For example, $I_{TBS}$=3, $N_{PRB}$, =10, a TBS of 568 bits is corresponding to 8 PRBs for non-URLLC according to Table 1, and a TBS of ⌊568/8⌋=71 bits may be corresponding to 8 PRBs for URLLC service, etc.

According to this example, the following TBS table (Table 2) can be achieved.

TABLE 2

TBS table for URLLC (part)

| $I_{TBS}$ | $N_{PRB}$ | | | | | | | | | |
|---|---|---|---|---|---|---|---|---|---|---|
|  | 1 | 2 | 3 | 4 | 5 | 6 | 7 | 8 | 9 | 10 ... |
| 0 | 2 | 4 | 7 | 11 | 15 | 19 | 22 | 26 | 28 | 32 ... |
| 1 | 3 | 7 | 11 | 18 | 22 | 26 | 28 | 32 | 41 | 43 ... |
| 2 | 4 | 9 | 18 | 22 | 26 | 32 | 37 | 41 | 47 | 53 ... |
| 3 | 5 | 13 | 22 | 26 | 32 | 41 | 49 | 55 | 63 | 71 ... |

There is another scaling way, which scales the $N_{PRB}$ by N≥2, afterwards, ⌊$N_{PRB}$/N⌋ is used to index the TBS corresponding to non-URLLC. With also the above example, ($I_{TBS}$, =3, $N_{PRB}$=10) is granted for URLLC, the TBS is determined by ($I_{TBS}$=3, $N_{PRB}$=10/N), if N=10, then, a TBS of 40 bits is used for URLLC while a TBS of 568 bits is used for non-URLLC.

According to this example, the following TBS table (Table 3) can be achieved.

TABLE 3

TBS table for URL LC (part)

| $I_{TBS}$ | $N_{PRB}$ | | | | | | | | | | |
|---|---|---|---|---|---|---|---|---|---|---|---|
|  | 10 | 20 | 30 | 40 | 50 | 60 | 70 | 80 | 90 | 100 | 110 |
| 0 | 16 | 32 | 56 | 88 | 120 | 152 | 176 | 208 | 224 | 256 | 288 |
| 1 | 24 | 56 | 88 | 144 | 176 | 208 | 224 | 256 | 328 | 344 | 376 |
| 2 | 32 | 72 | 144 | 176 | 208 | 256 | 296 | 328 | 376 | 424 | 472 |
| 3 | 40 | 104 | 176 | 208 | 256 | 328 | 392 | 440 | 504 | 568 | 616 |

By using one of such scaling methods, two sets of TBS are able to be obtained for non-URLLC and URLLC.

Alternatively or additionally, the TBS table for URLLC can be generated according to its reliability boosting requirement. Factors being considered includes one or more of: block error ratio (BLER), transmission power, minimum width of frequency band, cell coverage, link budget, mobility characters, DMRS pattern, and terminal sensitivity.

For example, for non-URLLC, all MCSs and possible transmission ranks are supported. When determining TBS for URLLC, only lower MCS grades and transmission ranks are supported. Some of high MCS grades and ranks have to be limited. In this regard, a maximum $I_{TBS}$ or rank number (e.g., maximum $I_{TBS}$=8) is notified to UE, then DCI is able to carry less information bits (e.g., 3 bits) for specifying $T_{TBS}$. UE can use these less information bits (e.g., 3 bits) in DCI to identify proper TBS without ambiguity. In other words, the DCI information about the TBS index $I_{TBS}$ will be of less information bits so that this helps to have a better DCI efficiency, this helps to offset DCI efficiency degradation as DCI information also needs reliability boosting by increasing redundancy.

When URLLC has different grades of requirements on reliability and latency, different TBS tables are designed for each of these grades. Different subsets of TBS tables grouped from the set of TBS tables for URLLC service are associated with different URLLC grades. For different grades of URLLC services, when a radio bearer is being established, an RRC signaling is sent from evolved Node B (eNB) side to a UE to configure its parameter on its TBS table selection. The parameter can be RRC configured as semi-static one or it can be only used as an initial index number of table. Then, the DCI may carry this information when granting the UE for URLLC data transmissions at both DownLink (DL) and UpLink (UL) or in separate DCI information.

In case of one set of tables are scaled versions of another set of tables, such as URLLC tables are scaled one of non-URLLC ones, the information of N can be notified or pre-configured when a radio bearer is being established. For example, N is frequency domain spreading factor or any other relevant scaling factor on TBS for URLLC. This information can be implicitly or explicitly instructed to a UE for its URLLC service. When UE receives the scaling factor N, it scales the TBS looked up at the existing TBS table and scales it in a way described above.

By receiving the scaling factor and generating a TBS table for URLLC from an existing TBS table for non-URLLC at the UE, the UE does not need to store as many as TBS tables as its initial configuration. The eNB does not need to transmit the entire TBS table for URLLC selected to the UE. Less bytes would be carried to the UE to save resource on air interface. As a similar approach, a basic TBS table can be initially configured in the UE. By receiving different scaling factors as indications of TBS table selection, TBS tables for URLLC traffic and non-URLLC traffic can be generated by the UE without pre-configured in it.

As mentioned above, alternatively, a set of TBS table for URLLC traffic and another set of TBS table for non-URLLC traffic can be pre-configured in the UE. Upon receiving a TBS table index as indication of TBS table selection by the eNB, the UE identifies the selected TBS table among the table set. One can understand that TBS table sets for non-URLLC traffic and URLLC traffic are not necessarily separated by specific set index. For instance, TBS table indexes 1 to 5 represent TBS table set for non-URLLC traffic and TBS table indexes 6 to 10 represent TBS table set for URLLC traffic.

UE can receive the information on table selection by the network node through Radio Resource Control (RRC) or Downlink Control Information (DCI). $N_{PRB}$ can be informed to the UE through DCI and $I_{TBS}$ can be acknowledged by the UE through scheduling information. As such, a TBS can be found in the identified TBS table according to $N_{PRB}$ and $I_{TBS}$. As a result, the TBS is used for URLLC communication with the eNB.

One can also understand that other TBS/MCS mapping tables such as mapping table between MCS and TBS index, or transport block size table between different layers, for example TBS translation tables as aforementioned, can be configured/generated in eNB respectively for URLLC traffics and non-URLLC traffics through similar methods as introduced above. A mapping table between MCS and TBS index, and/or a TBS translation table, both tables being for URLLC traffics, are/is selected by eNB after traffic type of communication with a UE is determined as URLLC traffic. Further, table index indicating selected table or determined scaling factor to a corresponding table is informed to the UE, so that the UE obtains a mapping table between MCS and TBS index, and/or a TBS translation table to be used through the table index or scaling factor.

Alternatively, a mapping table between MCS and TBS index, and/or a TBS translation table in existing solutions can continue to be used, in spite of traffic type of the communication between eNB and UE. Nevertheless, TBS table is chosen for a UE for a specific traffic type, URLLC, non-URLLC or URLLC grade. Thus a transmission block size would adaptively be chosen for specific requirement of the communication.

Besides, different lengths or versions of cyclic redundancy check (CRC) can be used for error detection in transport blocks. Relevant instructions on specifying CRC selection will be sent from eNB to UE. Longer CRC lengths are used for high grades of URLLC. Compared to non-URLLC service, the CRC lengths can be longer for a higher error protection for URLLC. For whole transmission block or code block segments, different lengths of CRC other than existing ones can be extended for URLLC. For example, the CRC may have a length of 8, 16, 24, 32, 40 or 48 bits.

Figure 3:
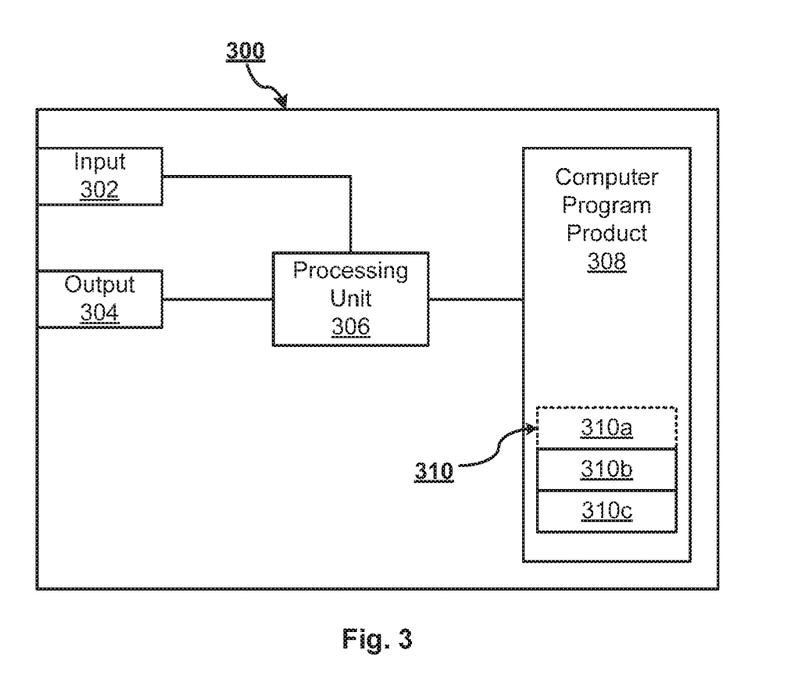
FIG. 3 schematically shows an embodiment of an arrangement 300 which may be used in network node 100.

FIG. 3 schematically shows an embodiment of an arrangement 300 which may be used in network node 100.

Comprised in the arrangement 300 are here a processing unit 306, e.g., with a Digital Signal Processor (DSP). The processing unit 306 may be a single unit or a plurality of units to perform different actions of procedures described herein. The arrangement 300 may also comprise an input unit 302 for receiving signals from other entities, and an output unit 304 for providing signal(s) to other entities. The input unit and the output unit may be arranged as an integrated entity or as illustrated in the example of FIG. 3.

Furthermore, the arrangement 300 comprises at least one computer program product 308 in the form of a non-volatile or volatile memory, e.g., an Electrically Erasable Programmable Read-Only Memory (EEPROM), a flash memory and a hard drive. The computer program product 308 comprises a computer program 310, which comprises code/computer readable instructions, which when executed by the processing unit 306 in the arrangement 300 causes the arrangement 300 in which it is comprised to perform the actions, e.g., of the procedure described earlier in conjunction with FIG. 2.

The computer program 310 may be configured as a computer program code structured in computer program modules 310a-310c.

Hence, in exemplifying embodiments corresponding to FIG. 3, the code in the computer program 310 of the arrangement 300 comprises a table scaling module 310a (optional) for causing the processing unit 306 to generate (S210) TBS/MCS mapping tables for different traffics; a table selecting module 310b for causing the processing unit 306 to select (S220) TBS/MCS mapping tables for different traffics (URLLC traffics and/or non-URLLC traffics); a UE informing module 310c for causing the processing unit 306 to inform (S230) table selections and/or a scaling factor to the UE 200.

Although the code means in the embodiments disclosed above in conjunction with FIG. 3 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

In another embodiment, an arrangement capable of URLLC communication which may be used in a user equipment is proposed. The arrangement includes a processing unit, an input/output interface, at least one computer program product in form of non-transient or transient memory. The computer program product comprises a computer program, which comprises code/computer readable instructions, which when executed by the processing unit, causes the arrangement in which it is comprised to perform the actions, e.g., of the procedure described earlier.

In an embodiment of the present disclosure, there is provided a computer-readable storage medium (e.g., computer program product 308) storing instructions that when executed, cause one or more computing devices to perform the methods according to the present disclosure.

Although the present technology has been described above with reference to specific embodiments, it is not intended to be limited to the specific form set forth herein. For example, the embodiments presented herein are not limited to the existing NR/LTE configuration; rather they are equally applicable to new NR/LTE configurations defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method in a network node for communicating with a User Equipment (UE), the method comprising:
   determining a traffic type for the UE;
   selecting a Transmission Block Size/Modulation and Coding Scheme (TBS/MCS) mapping table from a first set of TBS/MCS mapping tables for Ultra-Reliable and Low-Latency Communications (URLLC) traffic, in response to the traffic type being URLLC, wherein the TBS/MCS mapping table selected for URLLC traffic is different than a TBS/MCS mapping table used for non-URLLC traffic; and
   informing the UE the selection of the TBS/MCS mapping table.

2. The method of claim 1, wherein the selecting the TBS/MCS mapping table comprises:
   selecting the TBS/MCS mapping table from a first subset of TBS/MCS mapping tables for URLLC, in response to the traffic type being a first URLLC grade, wherein the first URLLC grade is associated with the first subset of TBS/MCS mapping tables which is a subset of the first set of TBS/MCS mapping tables for URLLC.

3. The method of claim 1, wherein a value of TBS indicated by the first set of TBS/MCS mapping tables is smaller than a value of a corresponding TBS indicated by a second set of TBS/MCS mapping tables for the non-URLLC traffic.

4. The method of claim 3, wherein dimension of a TBS/MCS mapping table in the first set of TBS/MCS mapping tables are different to dimension of a corresponding TBS/MCS mapping table in the second set of TBS/MCS mapping tables.

5. The method of claim 1, wherein the selecting the TBS/MCS mapping table from the first set of TBS/MCS mapping tables for the URLLC traffic comprises determining a TBS/MCS mapping table index indicating the selected TBS/MCS mapping table; and wherein the informing the UE the selection of the TBS/MCS mapping table comprising informing the TBS/MCS mapping table index to the UE.

6. The method of claim 1, wherein the selecting the TBS/MCS mapping table from the first set of TBS/MCS mapping tables for URLLC traffic comprises determining a scaling factor to a corresponding TBS/MCS mapping table, wherein the UE obtains the selected TBS/MCS mapping table based on the scaling factor; and wherein the informing the UE the selection of the TBS/MCS mapping table comprising informing the determined scaling factor to the UE.

7. The method of claim 6, wherein the scaling factor is a frequency spreading factor.

8. An apparatus for Ultra-Reliable and Low-Latency Communications (URLLC) with a user equipment (UE), the apparatus comprising:
   a processing unit and at least one computer program product, wherein the at least one computer program product comprises computer readable instructions which, when executed by the processing unit, cause the apparatus to:
   determine a traffic type for the UE;
   select a Transmission Block Size/Modulation and Coding Scheme (TBS/MCS) mapping table from a first set of TBS/MCS mapping tables for URLLC traffic, in response to the traffic type being URLLC, wherein the TBS/MCS mapping table selected for the URLLC traffic is different than a TBS/MCS mapping table used for non-URLLC traffic; and
   inform the UE of the selected TBS/MCS mapping table.

9. The apparatus according to claim 8, wherein the computer readable instructions which, when executed by the processing unit, further cause the apparatus to:
   select the TBS/MCS mapping table from a first subset of TBS/MCS mapping tables for URLLC, in response to the traffic type being a first URLLC grade, wherein the first URLLC grade is associated with the first subset of TBS/MCS mapping tables which is a subset of the first set of TBS/MCS mapping tables for URLLC.

10. The apparatus according to claim 8, wherein a value of TBS indicated by the first set of TBS/MCS mapping tables is smaller than a value of a corresponding TBS indicated by a second set of TBS/MCS mapping tables for non-URLLC traffic.

11. The apparatus according to claim 10, wherein dimension of a TBS/MCS mapping table in the first set of TBS/MCS mapping tables are different to dimension of a corresponding TBS/MCS mapping table in the second set of TBS/MCS mapping tables.

12. The apparatus according to claim 8, wherein the computer readable instructions which, when executed by the processing unit, further cause the apparatus to:
 determine a TBS/MCS mapping table index indicating the selected TBS/MCS mapping table; and
 inform the TBS/MCS mapping table index to the UE.

13. The apparatus according to claim 8, wherein the computer readable instructions which, when executed by the processing unit, further cause the apparatus to:
 determine a scaling factor to a corresponding TBS/MCS mapping table, wherein the UE obtains the selected TBS/MCS mapping table based on the scaling factor; and
 inform the scaling factor to the UE.

14. The apparatus according to claim 13, wherein the corresponding TBS/MCS mapping table is a TBS/MCS mapping table in a second set of TBS/MCS mapping tables for non-URLLC traffic.

15. The apparatus according to claim 13, wherein the scaling factor is a frequency spreading factor.

16. An apparatus for Ultra-Reliable and Low-Latency Communications (URLLC) with a network node, the apparatus comprising:
 a processing unit and at least one computer program product, wherein the at least one computer program product comprises computer readable instructions which, when executed by the processing unit, cause the apparatus to:
 request for establishing a radio bearer with the network node for communication of URLLC traffic;
 receive information of a selected Transmission Block Size/Modulation and Coding Scheme (TBS/MCS) mapping table for URLLC traffic, wherein the TBS/MCS mapping table selected for the URLLC traffic is different than a TBS/MCS mapping table used for non-URLLC traffic; and
 choose a TBS/MCS mapping from the selected TBS/MCS mapping table according to a scheduling information.

17. The apparatus according to claim 16, wherein the received information of the selected TBS/MCS mapping table for URLLC traffic comprising a TBS/MCS mapping table index indicating the selected TBS/MCS mapping table.

18. The apparatus according to claim 16, wherein the received information of the selected TBS/MCS mapping table for URLLC traffic comprising a scaling factor to apply to a corresponding TBS/MCS mapping table; and the apparatus is further caused to obtain the selected TBS/MCS mapping table based on applying the scaling factor to the corresponding TBS/MCS mapping table.

19. The apparatus according to claim 18, wherein the corresponding TBS/MCS mapping table is a TBS/MCS mapping table in a second set of TBS/MCS mapping tables used for the non-URLLC traffic.

20. The apparatus according to claim 16, wherein the apparatus is further caused to determine a cyclic redundancy check (CRC) length according to a URLLC grade.

\* \* \* \* \*